United States Patent
Masaka et al.

(10) Patent No.: US 9,269,967 B2
(45) Date of Patent: Feb. 23, 2016

(54) GASKET

(75) Inventors: Takeshi Masaka, Fujisawa (JP);
Yoshihiro Kurano, Fujisawa (JP);
Shotaro Koga, Fujisawa (JP)

(73) Assignee: NOK Corporation (JP)

( * ) Notice: Subject to any disclaimer, the term of this patent is extended or adjusted under 35 U.S.C. 154(b) by 328 days.

(21) Appl. No.: 13/700,578

(22) PCT Filed: May 26, 2011

(86) PCT No.: PCT/JP2011/062047
§ 371 (c)(1),
(2), (4) Date: Nov. 28, 2012

(87) PCT Pub. No.: WO2011/158624
PCT Pub. Date: Dec. 22, 2011

(65) Prior Publication Data
US 2013/0065158 A1    Mar. 14, 2013

(30) Foreign Application Priority Data

Jun. 14, 2010  (JP) ................................. 2010-134784
Aug. 25, 2010  (JP) ................................. 2010-187844

(51) Int. Cl.
*H01M 8/02* (2006.01)
*F16J 15/10* (2006.01)
*H01M 2/08* (2006.01)

(52) U.S. Cl.
CPC ............ *H01M 8/0271* (2013.01); *F16J 15/104* (2013.01); *H01M 2/08* (2013.01); *H01M 8/0273* (2013.01); *H01M 8/0276* (2013.01); *H01M 8/0286* (2013.01); *Y02E 60/50* (2013.01)

(58) Field of Classification Search
CPC ........ H01M 8/02; H01M 8/0271; H01M 2/08
USPC ........................... 429/516, 507–511; 277/644
See application file for complete search history.

(56) References Cited

U.S. PATENT DOCUMENTS

| 4,158,757 | A  | * | 6/1979  | Reichert et al. ............ 200/302.1 |
| 6,231,053 | B1 | * | 5/2001  | Wakamatsu ................... 277/628 |
| 2006/0269818 | A1 | * | 11/2006 | Inoue et al. ..................... 429/35 |
| 2007/0196717 | A1 | * | 8/2007  | Kuroki et al. ................... 429/35 |
| 2009/0202884 | A1 |   | 8/2009  | Morimoto et al. |
| 2011/0097647 | A1 | * | 4/2011  | Iju et al. ........................ 429/509 |

FOREIGN PATENT DOCUMENTS

| EP | 2058883 A1 | 5/2009 |
| JP | 2002228001 A | 8/2002 |
| JP | 2004245341 A | 9/2004 |

(Continued)

*Primary Examiner* — Stewart Fraser
(74) *Attorney, Agent, or Firm* — Harness, Dickey & Pierce, P.L.C.

(57) ABSTRACT

Provided is a gasket which can improve a handling property of the gasket by enhancing a rigidity of a carrier, can secure a space saving without increasing a thickness of the gasket, and can improve a yield ratio of a resin material, in the gasket of a type that a gasket body is integrated with the resin carrier. A planar gasket used by being pinched between two members superposed with each other has a gasket body achieving a seal action, and a carrier retaining the gasket body, the carrier is formed as a predetermined planar shape by a metal mold with a resin material, and is formed as a stepped shape by setting a partial portion which is superposed with the gasket body on a plane to a thin portion, and setting the other portion which is not superposed with the gasket body on the plane to a thick portion.

10 Claims, 10 Drawing Sheets

(56) References Cited

FOREIGN PATENT DOCUMENTS

| | | |
|---|---|---|
| JP | 2005226692 A | 8/2005 |
| JP | 2006210234 A | 8/2006 |
| JP | 2008218287 A | 9/2008 |
| JP | 2009049025 A | 3/2009 |
| JP | 2010112401 A | 5/2010 |
| WO | WO-2008129840 A1 | 10/2008 |

* cited by examiner

GASKET

CROSS-REFERENCE TO RELATED APPLICATIONS

This application is a U.S. National Stage Application of International Application No. PCT/JP2011/062047, filed on May 26, 2011 and published in Japanese as WO 2011/158624 on Dec. 22, 2011. This application claims the benefit of Japanese Application Nos. 2010-134784, filed on Jun. 14, 2010 and 2010-187844, filed on Aug. 25, 2010. The entire disclosures of the above applications are incorporated herein by reference.

BACKGROUND OF THE INVENTION

1. Field of the Invention

The present invention relates to a gasket in accordance with a seal technique. The gasket in accordance with the present invention is used, for example, as a gasket for a fuel battery, or as the other general gasket.

2. Description of the Conventional Art

For example, for a popularization of a fuel battery in the future, there is demanded an improvement of a productivity as well as a low cost of a gasket and an improvement of a handling property for that purpose (a provision of a certain degree of rigidity in a planar gasket and an easy handling thereof, for example, an easy gripping thereof by a chuck apparatus).

A plate integral type gasket (in which a plate is constructed, for example, by a separator of a fuel battery cell and the plate is a constructing part of a fuel battery main body) which is a prior art, has an advantage that a handling property is improved, since the gasket is retained by the plate and the rigidity is increased at that degree, in comparison with a rubber only type gasket (R/O). However, it is necessary to take into consideration a replacement of the gasket at a time of popularizing the fuel battery, and since the plate integrated type gasket is the integrated product, it is necessary to replace the plate in addition to the replacement of the gasket.

In this regard, in the R/O, it is sufficient to replace only the gasket, however, since the rigidity is low in the rubber only, there is the problem that the handling property is not good as mentioned above.

Further, in order to improve the R/O handling property, there can be thought that the gasket is integrated with a carrier which is constructed by a resin film (the carrier is an exclusive gasket constructing part which retains the gasket and is not a constructing part of the fuel battery main body) as described in the following patent document 1, however, since the resin film generally has a thin thickness (for example, about 3 mm) and can not be said to have a sufficiently high rigidity, it is demanded to further increase the rigidity and improve a handling property thereby.

Further, in the case that a ready-made resin film is used as the carrier as mentioned above, it is used after cutting a considerable area portion of the resin film (drawing off the film) in connection with a provision of a space portion which passes through in a thickness direction within a gasket plane. Accordingly, there is a disadvantage that a yield ratio is not good with regard to the film, and further with regard to the resin material.

SUMMARY OF THE INVENTION

Problem to be Solved by the Invention

The present invention is made by taking the point mentioned above into consideration, and an object of the present invention is to provide a gasket which can improve a handling property of the gasket by further enhancing a rigidity of a carrier, can secure a space saving without increasing a thickness of the gasket, and can improve a yield ratio of a resin material, in the gasket of a type that a gasket (a gasket body) made of a rubber-like elastic material is integrated with the carrier made of a resin.

Further, in addition to the above mentioned advantages, an object of the present invention is to provide a gasket which can be easily manufactured by omitting a bonding step from a manufacturing process, in the gasket of the type that the gasket (the gasket body) made of the rubber-like elastic material is integrated with the carrier made of the resin.

Means for Solving the Problem

In order to achieve the object mentioned above, a gasket in accordance with a first aspect of the present invention is a planar gasket which is used by being pinched between two members (for example, a separator in a fuel battery cell and an MEA as the two members) which are superposed with each other, the gasket comprising:

a gasket body which achieves a seal action; and a carrier which retains the gasket body, wherein the carrier is formed as a predetermined planar shape by a metal mold with a resin material, and is formed as a stepped shape by setting a partial portion which is superposed with the gasket body on a plane to a thin portion, and setting the other portion which is not superposed with the gasket body on the plane to a thick portion.

Further, a gasket in accordance with a second aspect of the present invention is the gasket described in the first aspect mentioned above, wherein the gasket body has a portion which is superposed with the thin portion in the carrier on the plane and a portion which is not superposed therewith, and a seal lip is provided at the latter position which is not superposed among them.

Further, a gasket in accordance with a third aspect of the present invention is the gasket described in the first aspect mentioned above, wherein the gasket body has a portion which is superposed with the thin portion in the carrier on the plane and a portion which is not superposed therewith, and a seal lip is provided at the former portion which is superposed among them.

Further, a gasket in accordance with a fourth aspect of the present invention is the gasket described in any one of the first to third aspects mentioned above, wherein the gasket body is formed by injection molding a non-adhesive rubber after applying an adhesive agent to the carrier, or by injection molding an adhesive rubber without applying any adhesive agent to the carrier.

Further, a gasket in accordance with a fifth aspect of the present invention is the gasket described in any one of the first to third aspects mentioned above, wherein the gasket body is formed by injection molding a non-adhesive rubber without applying any adhesive agent to the carrier, and the gasket body and the carrier are provided with a retaining structure for preventing the both from coming off from each other.

Further, a gasket in accordance with a sixth aspect of the present invention is the gasket described in the fifth aspect mentioned above, wherein the retaining structure is constructed by an engagement of the gasket body with a three-dimensional shape such as a convex portion, a concave portion or a through hole which is provided in the carrier.

Further, a gasket in accordance with a seventh aspect of the present invention is the gasket described in any one of the first to sixth aspects mentioned above, wherein the gasket is a gasket for a fuel battery which is embedded in a fuel battery stack or cell.

The prior art in which the gasket is integrated with the carrier constructed by the resin film has room for improvement in the handling property thereof, since the resin film is fixed in its thickness dimension over a whole surface, and does not have any portion which particularly secures the rigidity. On the contrary, in the present invention, since the carrier is formed as the predetermined planar shape by the metal mold with the resin material, and is formed as the stepped shape having the different thicknesses, by setting the partial portion which is superposed with the gasket body on the plane to the thin portion, and setting the other portion which is not superposed with the gasket body on the plane to the thin portion, it is possible to secure a sufficient rigidity by the thick portion among them.

Further, since it is structured such that the gasket body is superposed and integrated with the thin portion in place of the thick portion in the carrier on the plane, it is possible to secure a space saving in the gasket thickness direction without increasing the thickness as a whole of the gasket, and since the carrier is formed by the metal mold with the resin material, the carrier is originally formed as a product shape and does not have any portion to be cut. Therefore, it is possible to improve a yield ratio of the resin material.

In the case that both the thick portion and the thin portion are formed in one planar carrier, there can be thought a pattern that the thin portion is arranged in the center in the thickness direction of the thick portion or approximately the center, and a pattern that the thin portion is arranged so as to be biased to one side in the thickness direction of the thick portion, as a positional relationship in the thickness direction of the thin portion with respect to the thick portion. Further, in the case of the former pattern, a stepped shape is formed in each of both surfaces in the carrier thickness direction, and in the case of the latter pattern, a stepped shape is formed only in one surface in the thickness direction of the carrier (in this case, the thick portion and the thin portion are formed as the same planar shape (a flush shape) in a surface in an opposite side), however, both the patterns are included in the present invention.

Further, as the gasket body, it is general to be provided with a seal lip for enhancing a seal surface pressure, however, with regard to an arrangement of the seal lip, there can be thought a pattern that it is provided at a portion which is not superposed with the thin portion of the carrier on the plane (the second aspect), and a pattern that it is provided at a portion which is superposed with the thin portion of the carrier on the plane (the third aspect), and both the patterns are included in the present invention.

Further, the gasket body is formed by a predetermined rubber-like elastic body, and in more detail, is frequently formed by injection molding the non-adhesive rubber after applying the adhesive agent to the carrier, or by injection molding the adhesive rubber without applying the adhesive agent to the carrier (in this case, an adhesion property which the adhesive rubber is provided itself is utilized for the adhesion) (the fourth aspect), however, in these cases, in the gasket manufacturing process, a bonding step for bonding the gasket body to the carrier is necessary. On the contrary, if the bonding step can be omitted, the manufacturing of the gasket can be made easier at that degree.

Accordingly, in order to omit the bonding step as mentioned above, it is structured such that the gasket body is formed by injection molding the non-adhesive rubber without applying the adhesive agent to the carrier, and the gasket body and the carrier are provided with the retaining structure for preventing both the elements from coming off from each other (the fifth aspect), in place of the adhesion. As the retaining structure, it is preferable that the carrier is provided with an engagement portion which is constructed by the three-dimensional shape such as the convex portion, the concave portion or the through hole, and the gasket body is engaged with the engagement portion (the sixth aspect).

Further, in the case that the gasket in accordance with the present invention is used as the gasket for the fuel battery, the gasket for the fuel battery is provided with a portion which seals a peripheral edge portion of a reaction surface in the fuel battery cell (a reaction surface seal portion) or a position which seals a peripheral edge portion of a manifold (a manifold seal portion) for preventing a fuel gas or the like from leaking. Accordingly, the thin portion of the carrier and the gasket body are arranged in the seal portion (the seventh aspect).

Effect of the Invention

As described above, in accordance with the present invention, since the carrier is formed as the predetermined planar shape by the metal mold with the resin material, and is also formed as the stepped shape in which the partial portion which is superposed with the gasket body on the plane is set to the thin portion, and the other portion which is not superposed with the gasket body in the plane is set to the thick portion, it is possible to secure a sufficient rigidity by the thick portion among them, and it is possible to further improve a handling property of the gasket in connection with the sufficient rigidity. Further, since the gasket body is structured such as to be superposed with the thin portion of the carrier on the plane, the thickness as a whole of the gasket is not increased, and it is possible to secure a space saving. Further, since it is structured such that the carrier is formed by the metal mold with the resin material, the carrier is formed as the product shape from the beginning, and it is accordingly possible to improve a yield ratio of the resin material.

Further, in the case that the gasket body is formed by injection molding the non-adhesive rubber without applying the adhesive agent to the carrier, and the gasket body and the carrier are provided with the retaining structure for preventing both the elements from coming off from each other in place of the adhesion, it is possible to omit the bonding step from the gasket manufacturing process, and it is accordingly possible to make the manufacturing of the gasket easier at that degree.

Further, in the case that the gasket in accordance with the present invention is used as the gasket for the fuel battery, the effects mentioned above can be obtained in the gasket for the fuel battery.

DETAILED DESCRIPTION OF PREFERRED EMBODIMENTS

The following embodiments are included in the present invention.

(1) A low cost can be expected on the basis of a frame manufacturing construction method by molding, by setting a carrier member to a resin frame. Further, it is possible to maintain a rigidity of the frame and downsize a gasket by forming a cross section as a stepped shape. The resin frame is a molded product by a metal mold, and is not a resin film which is obtained by a roll forming.

(2) As an effect, it is possible to achieve a cost reduction on the basis of an automation from a gasket producing step to a stack assembly, by improving a rigidity of the gasket, and a cost reduction of the carrier member on the basis of a resin molding of a rigid body.

Figure 1A:
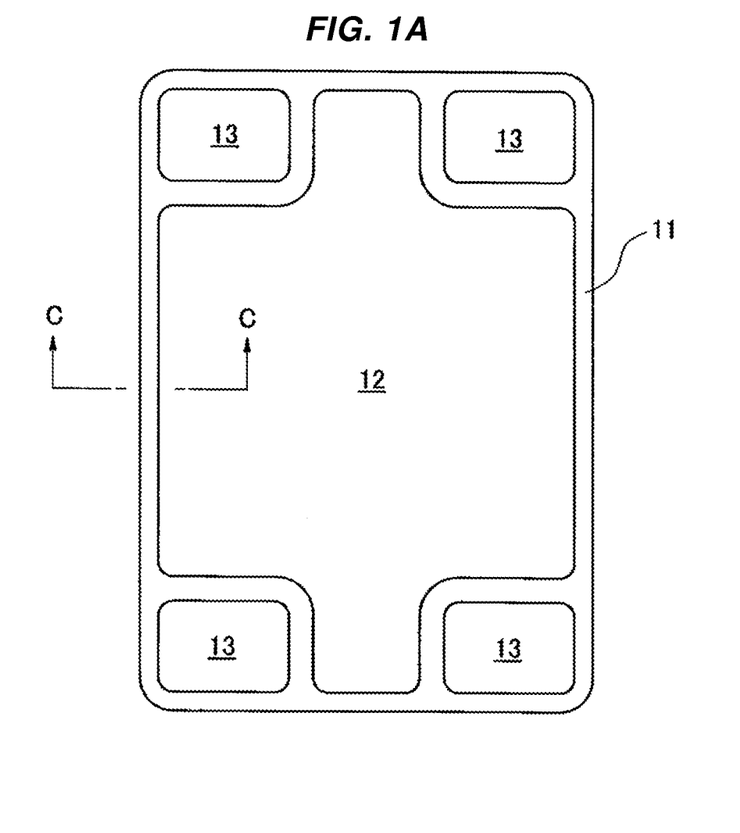
FIG. 1A is a general plan view of a carrier in a gasket in accordance with a comparative example.
Figure 1B:
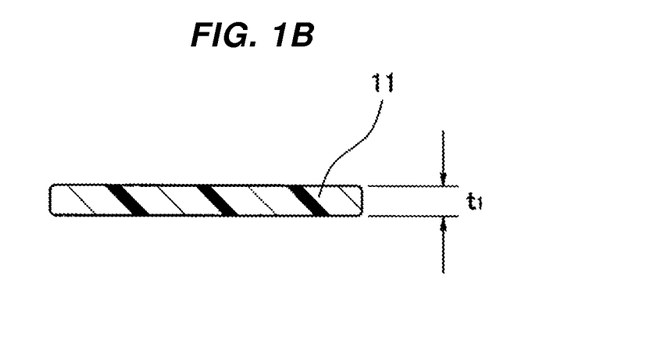
FIG. 1B is an enlarged cross sectional view along a line C-C in FIG. 1A.
Figure 2:
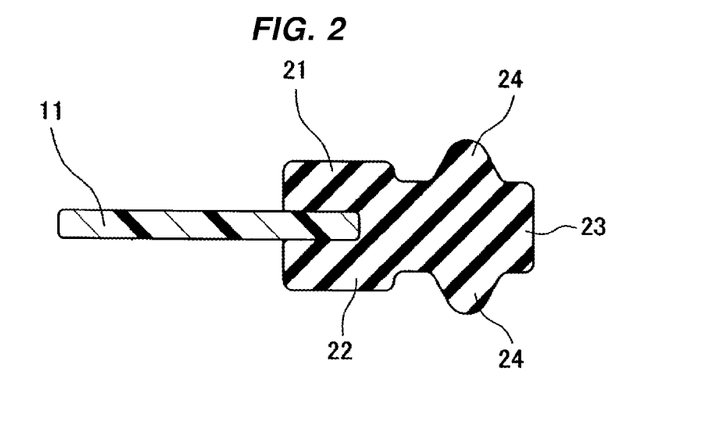
FIG. 2 is a cross sectional view of a substantial part of the gasket in accordance with the comparative example.
Figure 3:
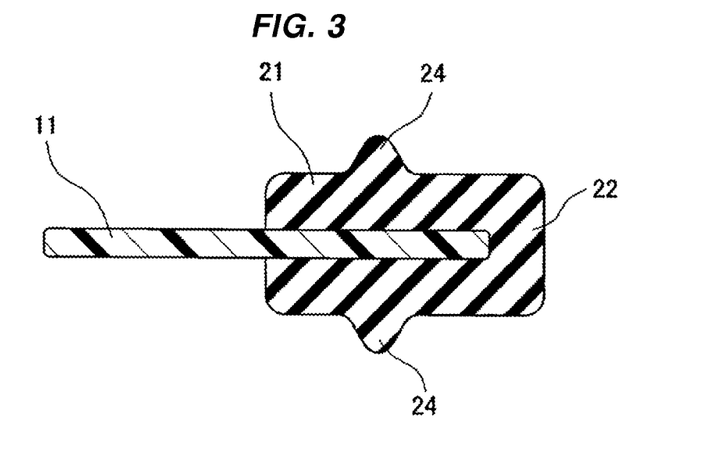
FIG. 3 is a cross sectional view of a substantial part of a gasket in accordance with the other comparative example.
Figure 4:
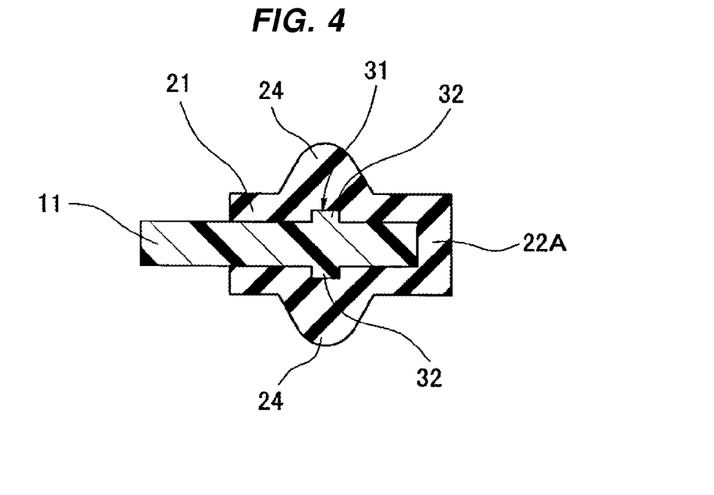
FIG. 4 is a cross sectional view of a substantial part of a gasket in accordance with the other comparative example.
Figure 5A:
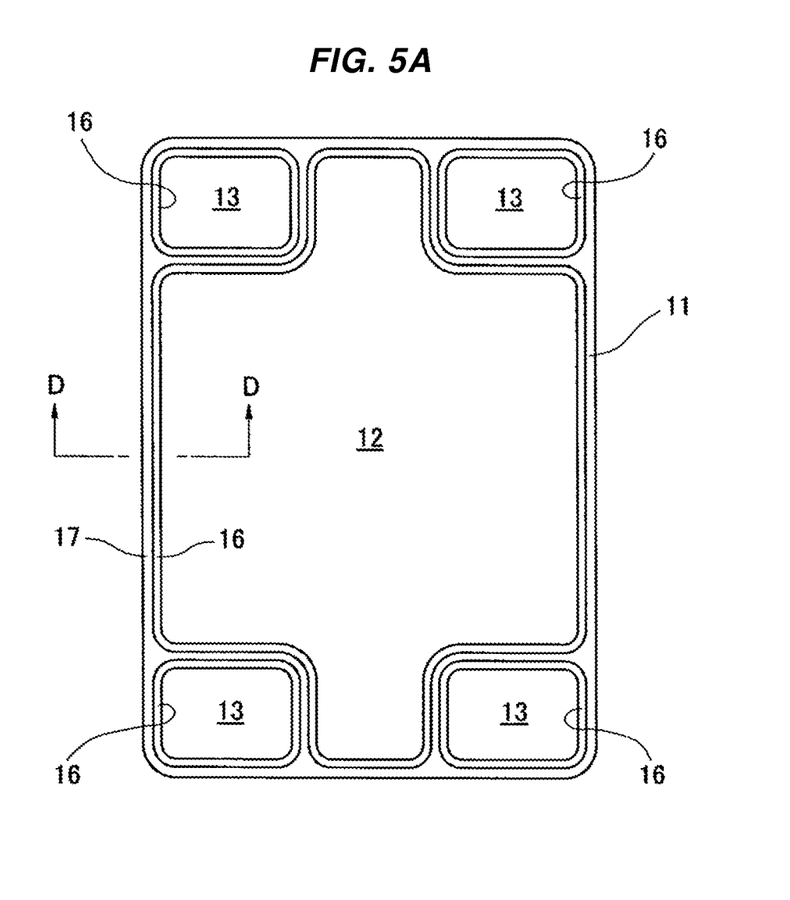
FIG. 5A is a general plan view of a carrier in a gasket in accordance with a first embodiment of the present invention.
Figure 5B:
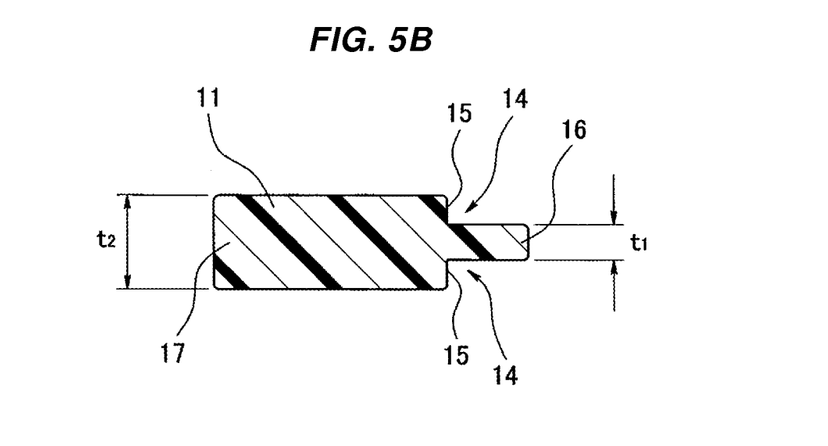
FIG. 5B is an enlarged cross sectional view along a line D-D in FIG. 5A.
Figure 6:
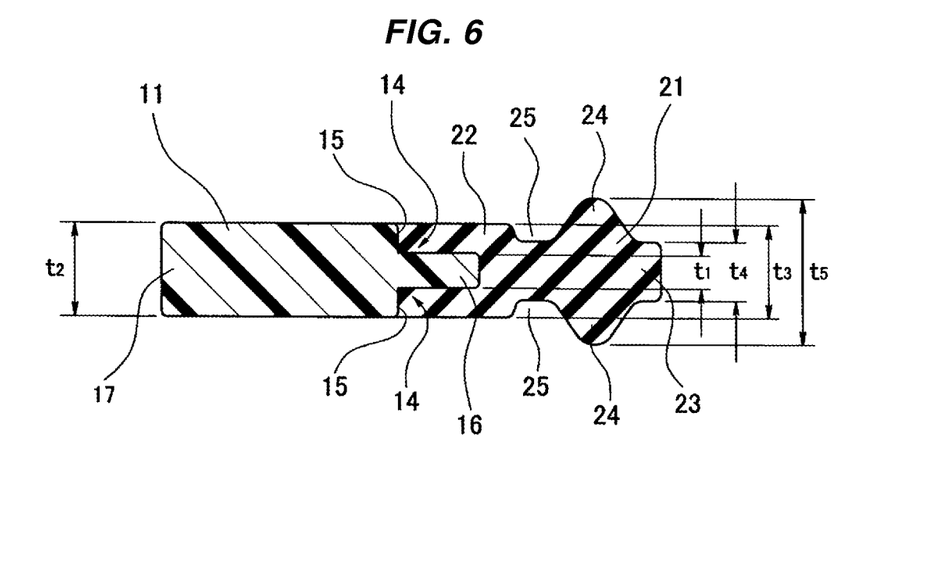
FIG. 6 is a cross sectional view of a substantial part of the gasket in accordance with the first embodiment of the present invention.
Figure 7:
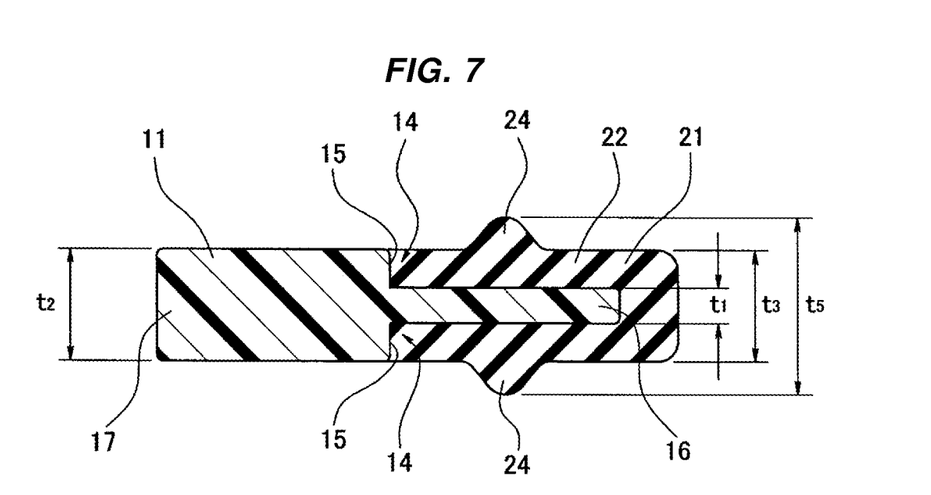
FIG. 7 is a cross sectional view of a substantial part of a gasket in accordance with a second embodiment of the present invention.

(3) For example, a cross sectional view in which a gasket (a gasket body) is integrated with a carrier member (a carrier) in FIG. 1 is shown in FIG. 2, FIG. 3 and FIG. 4. FIG. 2 shows a structure in which a seal lip is arranged outside the carrier, and a space saving at a time of assembling is expected. FIG. 3 shows a structure in which the seal lip is arranged on the carrier, and a rigidity keeping is expected in comparison with FIG. 2. While FIG. 2 and FIG. 3 employs an injection molding by applying an adhesive agent as a rubber material, or an adhesive rubber, FIG. 4 shows a structure in which a bonding process is omitted for the purpose of doing away with the bonding step, and a gasket forming portion is provided with a retaining portion which is constructed by a concavity and convexity or a through hole (a convex portion in the drawing) in place of the adhesive method. However, since the carrier member in FIG. 1 is formed as a thin planar shape (a quadrangular cross sectional shape), it is necessary to increase a thickness taking a rigidity into consideration. A carrier member in FIG. 5 is formed as a cross sectional shape which solves the problem, and is formed such that only a gasket forming portion is thin and the other portion is thick. A cross sectional view of a structure in which the gasket is integrated with the carrier member in FIG. 5 is shown in FIG. 6 and FIG. 7 and after. An effect of the gasket is the same as mentioned above, however, since only the gasket forming portion is thin, a space saving at a time of assembling is expected.

(4) The present invention relates to a structure (a cross sectional shape) of a reinforcing body for the purpose of improving a handling property in a reinforcing body (a carrier) integrated gasket. In order to solve the problem of the handling property in the R/O as a structure of the gasket for the fuel battery, it is generally carried out to integrally form the gasket in the reinforcing body such as a resin film or the like. In the case of the film integrated gasket, an improvement of the handling property can be achieved in comparison with the R/O type, however, since a thickness of the film is about 0.3 mm and is thin, it can not be yet said to be sufficient in an actual condition. In the case that the thickness of the film is set to about 1.0 mm which is a sufficient thickness for handling, there is generated a problem of a forming property, or since a thickness of the film coming to a rigid body in increased in a structure as shown in FIG. 3, a thickness of a rubber portion is reduced, so that a problem in an increase of a reaction force is generated, and a fear of a plate breakage is left. Accordingly, the present invention intends to solve the problems mentioned above, by forming the cross sectional shape of the reinforcing body as a two-stage structure as shown in FIG. 5. Further, since the film is manufactured by molding, it is possible to achieve an improvement of a yield ratio. In this case, the rubber material employs the injection molding by applying the adhesive agent or the adhesive rubber, in the same manner as the conventional one.

(5) Further, in the item (4) mentioned above, the rubber material of the gasket employs the injection molding by applying the adhesive agent or the adhesive rubber, however, in these cases, the bonding step is necessary in the manufacturing process. Accordingly, there can be thought that the manufacturing process is simplified by omitting the bonding step, and the following structures (6) and (7) are specifically provided.

(6)

(6-1) It is possible to suppress a rubber drop from the frame, by forming a further multi-step shape, with respect to the stepped shape frame (the carrier), and the bonding process is not necessary.

(6-2) It is possible to prevent the rubber drop by forming the carrier member as a partly convex shape or a partly concave shape, with respect to a lower surface portion of a rib (a seal lip) which appears a sealing function, and the bonding process between the carrier and the rubber is not necessary. A cross sectional shape of the carrier member itself is no object.

(6-3) A shape of the carrier convex portion or a shape of the carrier concave portion is formed as a quadrangular cross sectional shape or a semicircular shape, however, may be formed as the other shapes than them, for example, a triangular shape or the like.

(6-4) The shape of the carrier convex portion or the shape of the carrier concave portion may be arranged at plural numbers, and a further drop preventing effect appears in this case. A plurality of convex portions or concave portions are arranged from an inner peripheral side of the gasket toward an outer peripheral side, in a cross section which is orthogonal to a gasket longitudinal direction.

(6-5) In the case that there is a fear of an application of an effect which is not good for a seal function of a rib, by providing the shape of the carrier convex portion or the shape of the carrier concave portion in a lower surface portion of the rib, the shape of the carrier convex portion or the shape of the carrier concave portion is positioned at a position which is deviated from the rib on the plane.

(7)

(7-1) It is possible to suppress a rubber drop from the frame and it is possible to make the bonding process unnecessary, by setting a through hole to the frame and filling a rubber, with respect to the stepped shape frame (carrier).

(7-2) It is possible to prevent the rubber drop and it is possible to make the bonding process between the carrier and the rubber unnecessary, by setting a through hole to the carrier member between a rib (a seal lip) which generates the seal function and a gasket end portion (an outer peripheral portion).

(7-3) It is possible to prevent the rubber drop and it is possible to make the bonding process between the carrier and the rubber unnecessary, by setting the through hole to the carrier member between the rib (the seal lip) which generates the seal function and a carrier end portion (an inner peripheral portion). In this case, with respect to the item (7-2) mentioned above, it is possible to lighten an influence applied to a manifold area due to a moving deformation of the rubber to the manifold side.

(7-4) It is possible to prevent the rubber drop and it is possible to make the bonding process between the carrier and the rubber unnecessary, by setting the through hole to the carrier member in a lower surface of the rib (the seal lip) which generates the seal function. In this case, with respect to the items (7-2) and (7-3) mentioned above, it is possible to lighten the movement of the rib which is important on the seal function.

(7-5) It is possible to prevent the rubber drop and it is possible to make the bonding process between the carrier and the rubber unnecessary, by setting a plurality of through holes to the gasket and carrier surfaces. In this case, all the effects in the items (7-2), (7-3) and (7-4) can be generated. A plurality of through holes are arranged from the inner peripheral side of the gasket toward the outer peripheral side, in the cross section which is orthogonal to the gasket longitudinal direction.

(7-6) A shape (an opening shape) of the through hole is not particularly limited, however, a circular shape is desirable in the light of a working property.

EMBODIMENTS

Next, a description will be given of embodiments in accordance with the present invention, however, as a matter of convenience for description, a description will be first given of a comparative example. The comparative example is generated in a developing process of the present invention, and is not a known art. In this case, in both the embodiments and the comparative example, a gasket is a gasket for a fuel battery.

Comparative Example

FIG. 1 shows a carrier (a reinforcing body) 11 which is used in a gasket in accordance with the comparative example as its constructing part in a single part state, and the carrier 11 is formed as a planer rectangular shape by using a metal mold (an injection molding die or the like) while employing a predetermined resin material as a forming material, and is provided with a space portion 12 which is going to accommodate a reaction surface in a fuel battery cell and passes through in a thickness direction, and a plurality of (four in respective four corners of a rectangular shape in the drawing) space portions 13 which pass through the cell in the thickness direction and are going to form a manifold hole, within the plane.

Further, the carrier 11 is formed so as to be fixed its thickness t1 (for example, about 3 mm) over a whole surface thereof, and is formed in one planar shape as a whole of the carrier 11, as shown in a cross sectional view in FIG. 1B.

If a gasket body 21 which is constructed by a predetermined rubber-like elastic material is combined with the carrier 11 having the structure mentioned above, a cross sectional shape thereof becomes, for example, as shown in FIG. 2. In other words, the gasket body 21 integrally has an attached portion 22 which is attached (bonded) to an end portion of the carrier 11 and is formed as a C-shaped form in a cross section, an extension portion (a seal lip pedestal portion) 23 which is formed so as to be extended in a planar direction from the attached portion 22, and seal lips 24 which are provided respectively in both surfaces in the thickness direction of the extension portion 23 and are formed as a chevron shape in a cross section, and the seal lip 24 is provided at a position at which it does not lap over the carrier 11 on a plane.

Further, as the other example, in an example in FIG. 3, the gasket body 21 integrally has the attached portion 22 which is attached (bonded) to the end portion of the carrier 11 and is formed as the C-shaped form in the cross section, and the seal lips 24 which are provided respectively in both the surfaces in the thickness direction of the attached portion 22 and are formed as the chevron shape in the cross section, and the seal lip 24 is provided at a position at which it laps over the carrier 11 on the plane.

Further, as the other example, in an example in FIG. 4, the gasket body 21 integrally has a coated portion 22A which coats the end portion of the carrier 11 in a non-bonded manner and is formed as a C-shaped form in a cross section, and the seal lips 24 which are provided respectively in both surfaces in a thickness direction of the coated portion 22A and are formed as a chevron shape in a cross section, and the seal lip 24 is provided at a position at which it laps over the carrier 11 on a plane. The gasket body 21 and the carrier 11 are provided with a retaining structure 31 for preventing both the elements 11 and 21 from coming off from each other, and the retaining structure 31 is constructed by an engagement of the gasket body 21 with a three-dimensional shape formed by convex portions 32 which are respectively provided in both the surfaces in the thickness direction of the carrier 11.

In this case, in the examples in FIG. 2 and FIG. 3 mentioned above, the gasket body 21 is formed by injection molding a non-adhesive rubber after applying an adhesive agent to the carrier 11, or injection molding an adhesive rubber without applying the adhesive agent to the carrier 11, however, in the example in FIG. 4, the gasket body 21 is formed by injection molding the non-adhesive rubber without applying the adhesive agent to the carrier 11, and the retaining structure 31 is provided in place of the adhesion.

In the gaskets from FIG. 2 to FIG. 4, since the carrier 11 is formed as a product shape from the beginning by using a metal mold while employing a predetermined resin material as a forming material as mentioned above, any considerable area part of the resin film is not cut as is different from the prior art mentioned above, and it is accordingly possible to improve a yield ratio of the resin material at this degree.

However, in the gasket in accordance with the comparative example, the disadvantage still exists in the following points.

In other words, as mentioned above, the carrier 11 is formed so as to fix the thickness dimension t1 over a whole surface thereof, and is formed as one planar shape as a whole of the carrier 11. Accordingly, since a rigidity is low if the thickness t1 of the carrier 11 is small, it is not possible to solve the problem of the handling property that a whole of the gasket is sufficiently retain a shape of the gasket by the carrier 11. Further, if the thickness t1 of the carrier 11 is set larger for dissolving this problem, the gasket body 21 is attached to or coated on both the surfaces, and the thickness as a whole of the gasket is set larger. Therefore, it is impossible to meet the needs of saving space in the thickness direction.

Accordingly, in the present invention, a cross sectional shape of the carrier 11 is set as follows.

First Embodiment

FIG. 5 shows a carrier 11 (a gasket reinforcing body or a gasket retaining body) 11 which is used in a gasket in accordance with a first embodiment of the present invention as its constructing part in a single part state, the carrier 11 is formed as a planer rectangular shape by using a metal mold (an injection molding die or the like) while employing a predetermined resin material as a forming material, and is provided with a space portion 12 which is going to accommodate a reaction surface in a fuel battery cell and passes through in a thickness direction, and a plurality of (four in respective four corners of a rectangular shape in the drawing) space portions 13 which pass through the cell in the thickness direction and are going to form a manifold hole, within the plane.

Further, the carrier 11 is formed as a stepped shape 14 provided with a step surface 15 which is orthogonal to the plane, by setting a partial portion which is superposed on a plane with a gasket body 21 (refer to FIG. 6 or FIG. 7) to a thin portion 16 which is provided with a predetermined thickness t1 (for example, about 3 mm), and setting the other portion which is not superposed on a plane with the gasket body 21 to a thick portion 17 provided with a thickness t2 (for example, about 10 mm) which is larger than the thin portion 16, as shown by a cross sectional view in FIG. 5B. The partial portion which is superposed on the plane with the gasket body 21 is specifically a peripheral edge portion of the space portion 12 which is going to accommodate the reaction surface in the fuel battery cell, and a peripheral edge portion of a plurality of space portions 13 which pass through the cell in the thickness direction and are going to form the manifold hole. The other portion which is not superposed on the plane with the gasket body 21 is specifically the other portions than the peripheral edge portion of the space portion 12 which is going to accommodates the reaction surface in the fuel battery cell, and the other portions than the peripheral edge portion of a plurality of space portions 13 which pass through the cell in the thickness direction and are going to form the manifold hole. Further, as a positional relationship in the thickness direction of the thin portion 16 with respect to the thick portion 17, the thin portion 16 is arranged in the center or approximately in the center in the thickness direction of the thick portion 17. Accordingly, the stepped shape 14 is formed in each of both surfaces in the thickness direction of the carrier 11.

If a gasket body 21 which is constructed by a predetermined rubber-like elastic material is combined with the carrier 11 having the structure mentioned above, a cross sectional shape thereof becomes, for example, as shown in FIG. 6. In other words, the gasket body 21 integrally has an attached portion 22 which is attached (bonded) to an end portion of the carrier 11 and is formed as a C-shaped form in a cross section, an extension portion (a seal lip pedestal portion) 23 which is formed so as to be extended in a planar direction from the attached portion 22, and seal lips 24 which are provided respectively in both surfaces in the thickness direction of the extension portion 23 and are formed as a chevron shape in a cross section, and the extension portion 23 and the seal lips 24 are provided at positions at which they do not lap over the carrier 11 on a plane. Further, as a positional relationship in the thickness direction of the extension portion 23 with respect to the attached portion 22, the extension portion 23 is arranged in the center or approximately the center in the thickness direction of the attached portion 22. Further, on the assumption that a thickness of the attached portion 22 is set to t3, a thickness of the extension portion 23 is set to t4, and a thickness between leading ends of both the surface seal lips 24 is set to t5, a relationship of the thickness is set as follows.

$t3=t2$ (or $t3 \approx t2$)

$t3>t1$ $t4>t3$ $t4>t1$ $t5>t3$

Accordingly, an annular concave portion 25 which comes to a clearance space at a time when the seal lip 24 is compressed in the case of installing the gasket is provided between the attached portion 22 and the seal lip 24 which are adjacent to each other on the plane.

Second Embodiment

Further, as a second embodiment, in an example in FIG. 7, the gasket body 21 integrally has the attached portion 22 which is attached (bonded) to the end portion of the carrier 11 and is formed as a C-shaped form in a cross section, and the seal lips 24 which are provided respectively in both the surfaces in the thickness direction of the attached portion 22 and are formed as a chevron shape in the cross section, and the seal lip 24 is provided at a position at which it laps over the thin portion 16 of the carrier 11 on a plane. Further, on the assumption that a thickness of the attached portion 22 is set to t3, and a thickness between leading ends of both the surface seal lips 24 is set to t5, a relationship of the thickness is set as follows.

$t3=t2$ (or $t3 \approx t2$)

$t3>t1$ $t5>t3$

In the gasket in accordance with each of the embodiments which are provided with the structures mentioned above, since the carrier 11 is formed as the planar rectangular shape by using the metal mold while employing the predetermined resin material as the forming material, and is formed as the stepped shape 14 by setting the partial portion which is superposed on the plane with the gasket body 21 to the thin portion 16, and setting the other portion which is not superposed on the plane with the gasket body 21 to the thick portion 17, it is possible to secure a sufficient rigidity by the thick portion 17 among them, whereby it is possible to further improve the handling property of the gasket.

Further, since the gasket body 21 is structured such as to be superposed on the plane with the thin portion 16 not with the thick portion 17 in the carrier 11, a thickness of a whole of the gasket is not increased, and it is accordingly possible to secure a space saving in the gasket thickness direction.

Further, since the carrier 11 is structured such as to be formed by using the metal mold while employing the predetermined resin material as the forming material, the carrier 11 is formed as the product shape from the beginning, and it is accordingly possible to improve a yield ratio of the resin material.

In this case, in the gaskets in accordance with the first embodiment (FIG. 6) and the second embodiment (FIG. 7), the gasket body 21 is formed by injection molding the non-adhesive rubber after applying the adhesive agent to the carrier 11, or is formed by injection molding of the adhesive rubber without applying the adhesive agent to the carrier 11, however, there can be thought that the manufacturing of the gasket is made easier by omitting the bonding step from the manufacturing process. In this case, the gasket body 21 is formed by injection molding of the non-adhesive rubber without applying the adhesive agent to the carrier 11, and the retaining structure for preventing both the elements 11 and 21 from coming off from each other is provided in the gasket body 21 and the carrier 11, in place of the adhesion. The retaining structure is constructed by providing an engagement portion which is constructed by a three-dimensional shape such as a convex portion, a concave portion, a through hole or the like in the carrier 11, and engaging the gasket body 21 with respect to the engagement portion. A description will be given below of an embodiment of a non-adhesion type.

Third Embodiment

Figure 8:
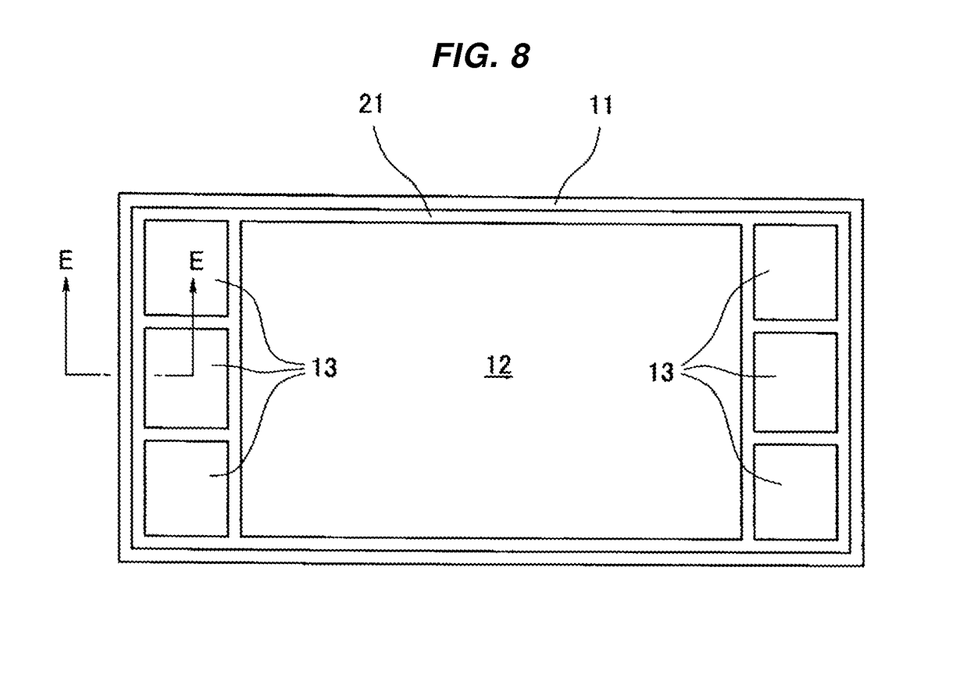
FIG. 8 is a cross sectional view of a substantial part of a gasket in accordance with a third embodiment of the present invention.

FIG. 8 shows an entire plane of a gasket in accordance with a third embodiment of the present invention. In this gasket, the carrier 11 is formed as a planar rectangular shape by using a metal mold (an injection molding die or the like) while employing a predetermined resin material as a forming material, and is provided with the space portion 12 which is going to accommodate the reaction surface in the fuel battery cell and passes through in the thickness direction, and a plurality of (three in each of both ends in a longitudinal direction of the rectangle in the drawing) space portions 13 which pass through the cell in the thickness direction and are going to form the manifold hole, within the plane.

Figure 9:
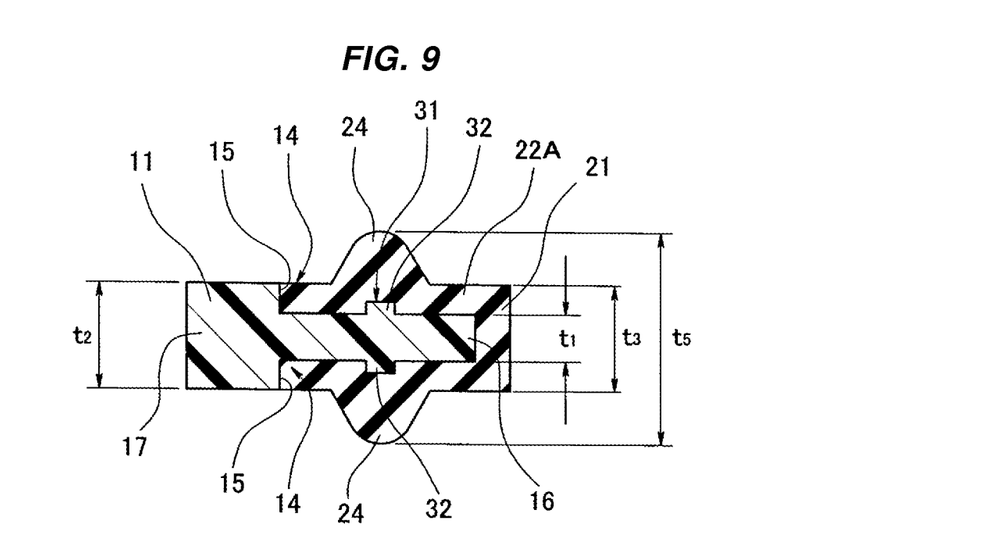
FIG. 9 is a cross sectional view of a substantial part of the gasket in accordance with the embodiment, and is an enlarged cross sectional view along a line E-E in FIG. 8.

Further, the carrier 11 is formed as the stepped shape 14 provided with the step surface 15 which is orthogonal to the plane, by setting a partial portion which is superposed on a plane with the gasket body 21 to the thin portion 16 which is provided with the predetermined thickness t1 (for example, about 3 mm), and setting the other portion which is not superposed on a plane with the gasket body 21 to the thick portion 17 provided with the thickness t2 (for example, about 10 mm) which is larger than the thin portion 16, as shown by a cross sectional view in FIG. 9. The partial portion which is superposed on the plane with the gasket body 21 is specifically the peripheral edge portion of the space portion 12 which is going to accommodate the reaction surface in the fuel battery cell, and the peripheral edge portion of a plurality of space portions 13 which pass through the cell in the thickness direction and are going to form the manifold hole. The other portion which is not superposed on the plane with the gasket body 21 is specifically the other portions than the peripheral edge portion of the space portion 12 which is going to accommodates the reaction surface in the fuel battery cell, and the other portions than the peripheral edge portion of a plurality of space portions 13 which pass through the cell in the thickness direction and are going to form the manifold hole. Further, as a positional relationship in the thickness direction of the thin portion 16 with respect to the thick portion 17, the thin portion 16 is arranged in the center or approximately in the center in the thickness direction of the thick portion 17. Accordingly, the stepped shape 14 is formed in each of both surfaces in the thickness direction of the carrier 11.

If the gasket body 21 which is constructed by the predetermined rubber-like elastic material is combined with the carrier 11 having the structure mentioned above, a cross sectional shape thereof becomes, for example, as shown in FIG. 9. In other words, the gasket body 21 integrally has a coated portion 22A which is coated with the end portion of the carrier 11 in a non-bonded manner and is formed as a C-shaped form in a cross section, and the seal lips 24 which are provided respectively in both surfaces in the thickness direction of the coated portion 22A and are formed as a chevron shape in a cross section, and the seal lips 24 are provided at positions at which they lap over the thin portion 16 of the carrier 11 on a plane. Further, on the assumption that a thickness of the coated portion 22A is set to t3, and a thickness of between the leading ends of both the surface seal lips 24 is set to t5, a relationship of the thickness is set as follows.

$$t3 = t2 \text{ (or } t3 \approx t2\text{)}$$

$$t3 > t1$$

$$t5 > t3$$

Further, since there is a fear that the gasket body 21 easily comes off from the carrier 11 if the gasket body 21 is assembled in the non-bonded manner with respect to the carrier 11, the gasket body 21 and the carrier 11 are provided with the retaining structure 31 for preventing both the elements 11 and 21 from coming off from each other, and the retaining structure 31 is structured specifically as follows.

In other words, in the third embodiment (FIG. 9), the three-dimensional shape which is constructed by the convex portion 32 is provided in each of both the surfaces in the thickness direction of the thin portion 16 in the carrier 11, and the convex portion 32 is structured such as to be embedded within the coated portion 22A of the gasket body 21 in accordance with an injection molding of the gasket body 21, and the gasket body 21 engages in a coming off direction (a rightward direction in the drawing) with respect to the convex portion 32, thereby constructing the retaining structure 31.

As the retaining structure 31, a shape and a structure thereof are not particularly limited as long as it can prevent both the elements 11 and 21 from coming off from each other, however, it may be additionally structured, for example, as follows.

Fourth Embodiment

Figure 10:
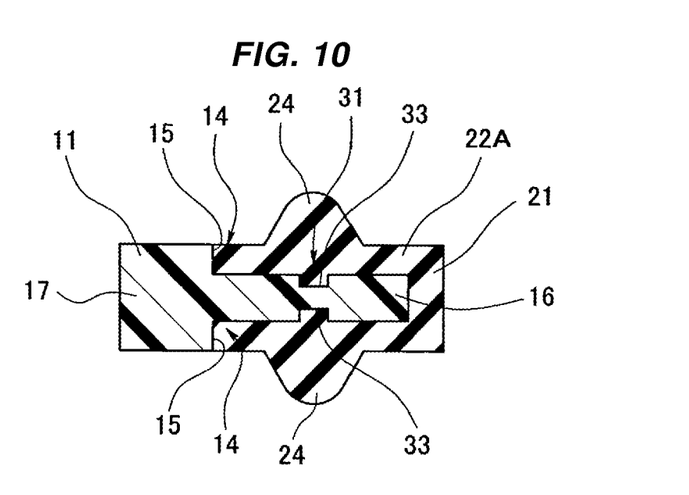
FIG. 10 is a cross sectional view of a substantial part of a gasket in accordance with a fourth embodiment of the present invention.

In a fourth embodiment shown in FIG. 10, a three-dimensional shape which is constructed by a concave portion 33 is provided in each of both the surfaces in the thickness direction of the thin portion 16 in the carrier 11, and the concave portion 33 is structured such that a partial rubber material of the gasket body 21 is filled in accordance with an injection molding of the gasket body 21, and the gasket body 21 engages in a coming off direction (a rightward direction in the drawing) with respect to the concave portion 33, thereby constructing the retaining structure 31.

Fifth Embodiment

Figure 11:
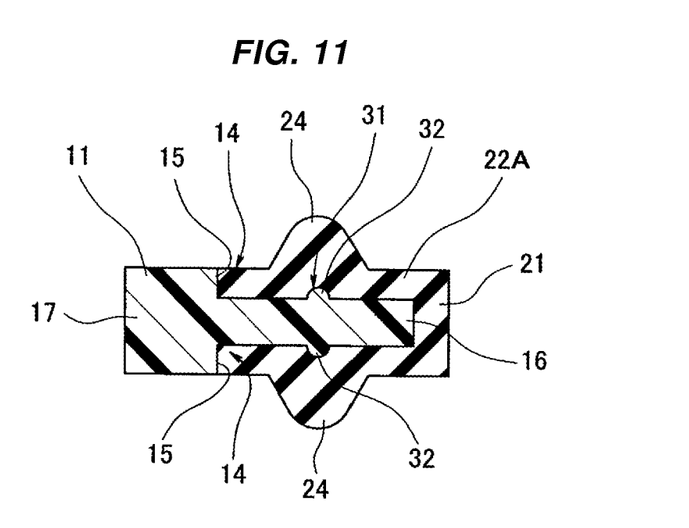
FIG. 11 is a cross sectional view of a substantial part of a gasket in accordance with a fifth embodiment of the present invention.

In the third embodiment (FIG. 9) and the fourth embodiment (FIG. 10), the cross sectional shapes of the convex portion 32 and the concave portion 33 are formed as a quadrangular shape, however, they may be formed as a semicircular shape or a triangular shape without being limited to this. In a fifth embodiment shown in FIG. 11, the cross sectional shape of the concave portion 32 is formed as a semicircular shape.

Sixth Embodiment

Figure 12:
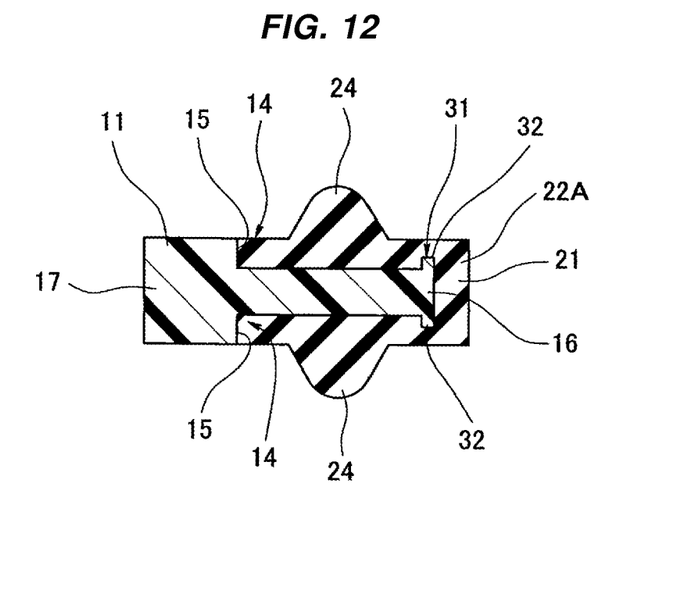
FIG. 12 is a cross sectional view of a substantial part of a gasket in accordance with a sixth embodiment of the present invention.

In the third embodiment (FIG. 9) and the fourth embodiment (FIG. 10), the convex portion 32 and the concave portion 33 are provided at the position which is superposed on the plane with the seal lip 24 in the gasket body 21, however, may be provided at a position which is not superposed on the plane with the seal lip 24 and is closer to the leading end of the thin portion 16, without being limited to this. In a sixth embodiment shown in FIG. 12, the convex portion 32 is provided at a position (a leading edge position) which is not superposed on the plane with the seal lip 24 and is close to the leading end of the thin portion 16.

Seventh Embodiment

Figure 13:
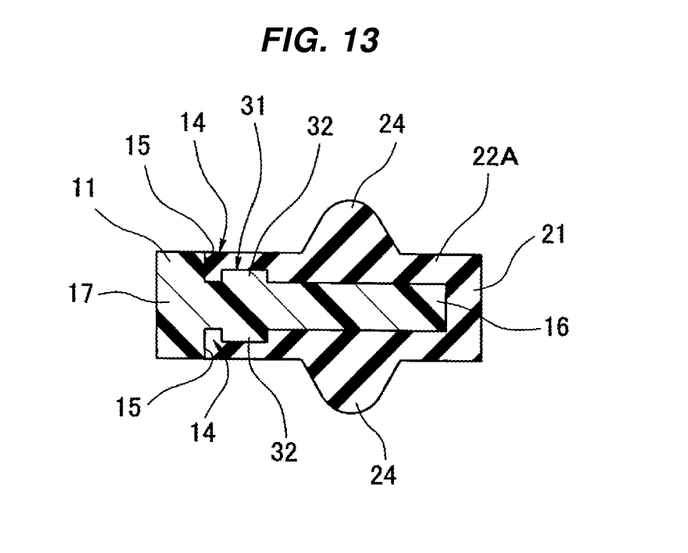
FIG. 13 is a cross sectional view of a substantial part of a gasket in accordance with a seventh embodiment of the present invention.

In the third embodiment (FIG. 9) and the fourth embodiment (FIG. 10), the convex portion 32 and the concave portion 33 are provided at the position which is superposed on the plane with the seal lip 24 in the gasket body 21, however, may be provided at a position (a position between the seal lip 24 and the thick portion 17) which is not superposed on the plane with the seal lip 24 and is closer to a base end of the thin portion 16. In a seventh embodiment shown in FIG. 13, the convex portion 32 is provided at a position which is not superposed on the plane with the seal lip 24 and is closer to the base end of the thin portion 16.

Eighth Embodiment

Figure 14:
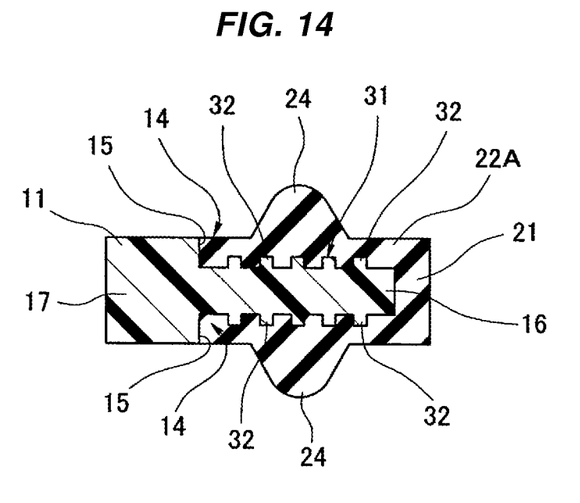
FIG. 14 is a cross sectional view of a substantial part of a gasket in accordance with an eighth embodiment of the present invention.

In the third embodiment (FIG. 9) and the fourth embodiment (FIG. 10), the convex portion 32 and the concave portion 33 are provided at one by one (one position) in each of both the surfaces in the thickness direction of the thin portion 16 in the carrier 11, however, may be provided at a plurality of positions without being limited to this. In an eighth embodiment shown in FIG. 14, the convex portions 32 are provided at a plurality of positions (five by five (five positions) in the drawing) over the position which is superposed on the plane with the seal lip 24, the position which is not superposed on the plane with the seal lip 24 and is closer to the leading end of the thin portion 16 and the position which is not superposed on the plane with the seal lip 24 and is closer to the base end of the thin portion 16.

Ninth Embodiment

Figure 15:
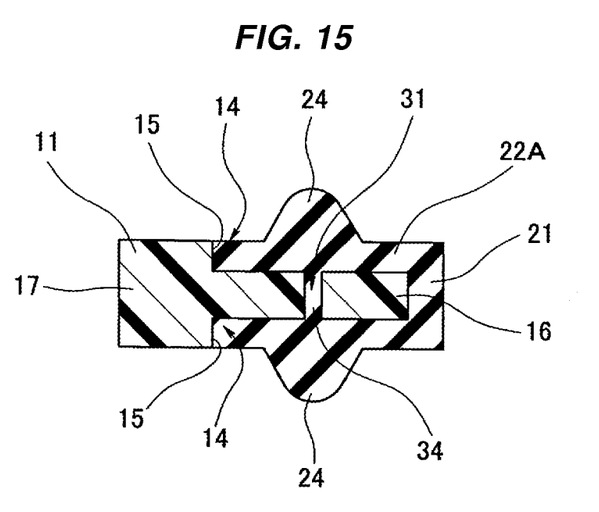
FIG. 15 is a cross sectional view of a substantial part of a gasket in accordance with a ninth embodiment of the present invention.

In a ninth embodiment shown in FIG. 15, a three-dimensional shape which is constructed by a through hole 34 passing through in the thickness direction is provided in the thin portion 16 in the carrier 11, and the through hole 34 is structured such that a partial rubber material of the gasket body 21 is filled in accordance with an injection molding of the gasket body 21, and the gasket body 21 engages in a coming off direction (a rightward direction in the drawing) with respect to the through hole 34, thereby constructing the retaining structure 31. A lot of through holes 34 are provided at a predetermined distance along a gasket longitudinal direction (a direction which is orthogonal to a paper surface in the drawing).

Tenth Embodiment

Figure 16:
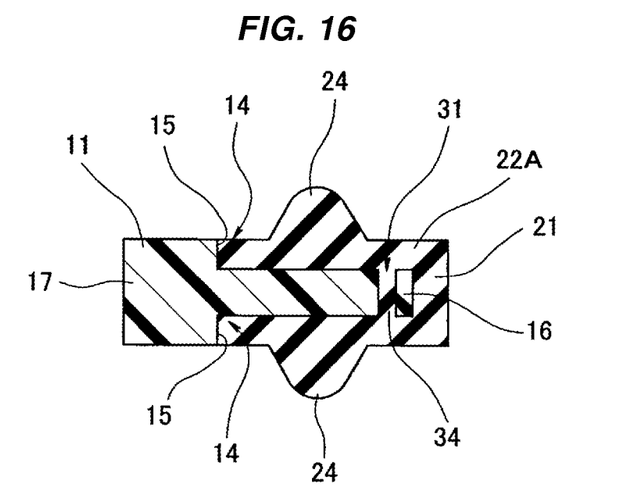
FIG. 16 is a cross sectional view of a substantial part of a gasket in accordance with a tenth embodiment of the present invention.

In the ninth embodiment (FIG. 15) mentioned above, the through hole 34 is provided at the position which is superposed on the plane with the seal lip 24 in the gasket body 21, however, may be provided at a position which is not superposed on the plane with the seal lip 24 and is closer to the leading end of the thin portion 16, without being limited to this. In a tenth embodiment shown in FIG. 16, the through hole 34 is provided at a position which is not superposed on the plane with the seal lip 24 and is closer to the leading end of the thin portion 16.

Eleventh Embodiment

Figure 17:
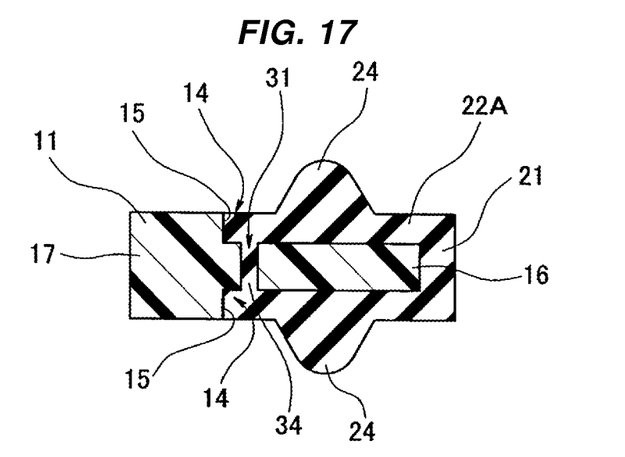
FIG. 17 is a cross sectional view of a substantial part of a gasket in accordance with an eleventh embodiment of the present invention.

In the ninth embodiment (FIG. 15) mentioned above, the through hole 34 is provided at the position which is superposed on the plane with the seal lip 24 in the gasket body 21, however, may be provided at a position which is not superposed on the plane with the seal lip 24 and is closer to the base end of the thin portion 16, without being limited to this. In an eleventh embodiment shown in FIG. 17, the through hole 34 is provided at a position which is not superposed on the plane with the seal lip 24 and is closer to the base end of the thin portion 16.

Twelfth Embodiment

Figure 18:
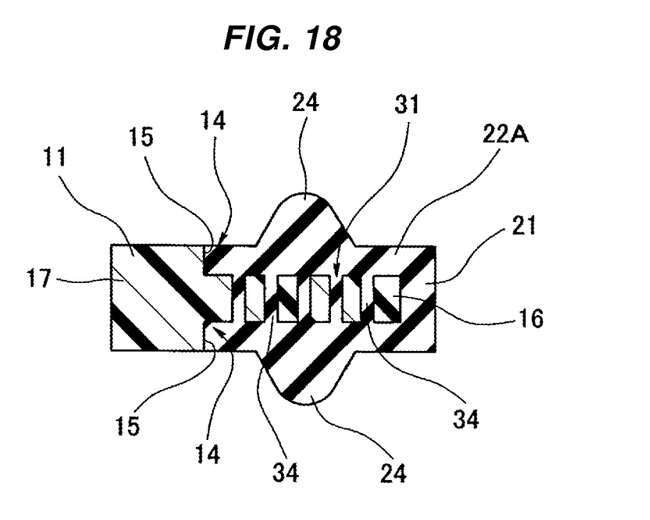
FIG. 18 is a cross sectional view of a substantial part of a gasket in accordance with a twelfth embodiment of the present invention.

In the ninth embodiment (FIG. 15) mentioned above, the through hole 34 is provided one by one (at one position) in a cross section which is orthogonal to the gasket longitudinal direction, however, may be provided at a plurality of positions without being limited to this. In a twelfth embodiment shown in FIG. 18, the through holes 34 are provided at a plurality of positions (five positions in the drawing) over the position which is superposed on the plane with the seal lip 24, the position which is not superposed on the plane with the seal lip 24 and is closer to the leading end of the thin portion 16, and the position which is not superposed on the plane with the seal lip 24 and is closer to the base end of the thin portion 16.

In this case, in each of the embodiments mentioned above, the convex portion 32 and the concave portion 33 are provided like a continuous linear shape which extends along the gasket longitudinal direction, however, a lot of them may be provided at a predetermined distance along the gasket longitudinal direction such as the through holes 34.

Further, in each of the embodiments mentioned above, the convex portion 32 and the concave portion 33 are provided in each of both the surfaces in the thickness direction of the thin portion 16 in the carrier 11, however, may be provided in only one surface.

Further, in each of the embodiments mentioned above, a whole structure of the gasket is set to the type in FIG. 7 (the type that the gasket body 21 has the attached portion 22 (the coated portion 22A) and the seal lip 24, and the seal lip 24 is provided at the position which is superposed on the plane with the thin portion 16 of the carrier 11), however, may be set to the type in FIG. 6 (the type that the gasket body 21 has the attached portion 22 (the coated portion 22A), the extension portion 23 and the seal lip 24, and the seal lip 24 is provided at the position which is not superposed on the plane with the thin portion 16 of the carrier 11), and the gasket of the type in FIG. 6 may be formed as the non-bonded structure as described in each of the embodiments.

What is claimed is:

1. A planar gasket adapted to be pinched between two members which are superposed with each other, the gasket comprising:
    a gasket body which forms a seal between the two members; and
    a carrier which retains said gasket body,
    wherein said carrier is formed to a predetermined planar shape by a metal mold with a resin material, and has a stepped shape including:
        a thin partial portion which is superposed with said gasket body on a plane, and
        a thick portion which is not superposed with said gasket body on the plane, and
    wherein said gasket body has a C-shaped superposed portion which is superposed with said thin partial portion of said carrier on the plane and a non-superposed portion which is not superposed with said thin partial portion, and a pair of seal lips oppositely extend from the superposed portion, and
    the thin partial portion has a thickness t1, the thick portion has a thickness t2, the superposed portion has a thickness t3, and a thickness between leading ends of the pair of seal lips is t5, $t3=t2$, $t3>t1$, and $t5>t3$, wherein said gasket body and said carrier are provided with a retaining structure for preventing said gasket body and said carrier from coming off from each other, and
    wherein said retaining structure is constructed by and engagement of said gasket body with a three-dimensional shape selected from a group including a convex portion, a concave portion or a through hole which is provided in said carrier.

2. The gasket as claimed in claim 1, wherein said gasket body is formed by injection molding a non-adhesive rubber after applying an adhesive agent to said carrier, or by injection molding an adhesive rubber without applying any adhesive agent to said carrier.

3. The gasket as claimed in claim 2, wherein said gasket is a gasket for a fuel battery which is embedded in a fuel battery stack or cell.

4. The gasket as claimed in claim 1, wherein said gasket body is formed by injection molding a non-adhesive rubber without applying any adhesive agent to said carrier.

5. The gasket as claimed in claim 4, wherein said gasket is a gasket for a fuel battery which is embedded in a fuel battery stack or cell.

6. The gasket as claimed in claim 1, wherein said gasket is a gasket for a fuel battery which is embedded in a fuel battery stack or cell.

7. The gasket as claimed in claim 1, wherein said retaining structure further comprises a concave portion provided in both surfaces in a thickness direction of said thin partial portion and part of the superposed portion of the gasket body is filled in the concave portion.

8. The gasket as claimed in claim 1, wherein said retaining structure for preventing said gasket body and said carrier from coming off from each other is provided along said superposed portion.

9. The gasket as claimed in claim 1, wherein said retaining structure for preventing said gasket body and said carrier from coming off from each other is provided along said non-superposed portion.

10. The gasket as claimed in claim 1, wherein said retaining structure for preventing said gasket body and said carrier from coming off from each other is provided so as to pan from said superposed portion to said non-superposed portion.

* * * * *